United States Patent [19]

Doerner

[11] 3,744,246

[45] July 10, 1973

[54] ROTARY CLOSED RANKINE CYCLE ENGINE WITH INTERNAL LUBRICATING SYSTEM

[75] Inventor: William A. Doerner, Wilmington, Del.

[73] Assignee: E. I. du Pont Nemours and Company, Wilmington, Del.

[22] Filed: Mar. 2, 1972

[21] Appl. No.: 231,232

[52] U.S. Cl.......................... 60/95, 60/108, 122/11, 415/18, 415/122, 308/106
[51] Int. Cl............................................ F01k 11/04
[58] Field of Search...................... 60/36, 108, 95; 122/11

[56] References Cited
UNITED STATES PATENTS

| | | | |
|---|---|---|---|
| 2,140,175 | 12/1938 | Starziczny | 60/108 R |
| 2,810,304 | 10/1957 | Ball | 74/789 |
| 3,260,050 | 7/1966 | Anderson | 60/108 R X |

*Primary Examiner*—Martin P. Schwadron
*Assistant Examiner*—H. Burks, Sr.
*Attorney*—Dexter N. Shaw, Charles H. Howson, Jr. et al.

[57] ABSTRACT

A rotary closed Rankine cycle engine comprising a housing rotatable about its axis and including an annular boiler adapted to contain a liquid power fluid. The housing is subdivided into separate expander and lubricant compartments. The expander is actuated by pressure vapor power fluid generated in the boiler and rotationally drives a coaxial shaft associated with other moving parts. An annular sump is provided in the lubricant compartment adapted to contain an annular lubricant bath of predetermined radial depth. Non-rotatable pump means is provided in the lubricant compartment operable by rotation of the housing relative to the pump to pump lubricant from the bath to the shaft and associated moving parts to lubricate the same. Heating means is provided for vaporizing excess power fluid that migrates along the shaft from the expander compartment to the lubricant compartment thereby raising the vapor pressure in the lubricant compartment to the vapor pressure in the expander compartment and balancing the pressure along the shaft to prevent further migration of power fluid from the expander compartment to the lubricant compartment.

7 Claims, 4 Drawing Figures

United States Patent [19]
Doerner

[11] 3,744,246
[45] July 10, 1973

PATENTED JUL 10 1973 3,744,246

ROTARY CLOSED RANKINE CYCLE ENGINE WITH INTERNAL LUBRICATING SYSTEM

This invention relates to new and useful improvements in rotary heat engines, and more particularly to closed Rankine cycle engines of the rotating type having novel means for lubricating the internal moving parts of the engine.

One of the problems in the design of closed Rankine cycle engines is the lubrication of the internal moving engine parts and this is especially true in closed Rankine cycle engines of the rotating type. When internal moving engine parts such as bearings, gears, and the like are lubricated in a conventional manner with oil or grease, it is necessary to isolate the power fluid from the lubricant to prevent the lubricant from being washed away and diluted by the power fluid. Complete separation of the power fluid and lubricant is very difficult, if not impossible, to provide and maintain. For this reason a common approach to the probelm has been to use a power fluid having properties that also provide lubrication for the internal moving parts of the engine.

However, while this approach has met with some degree of success in Rankine cycle engines of the non-rotating type, there is no available power fluid having adequate lubricating properties that provides the efficiency and stability required for satisfactory operation of a rotating closed Rankine cycle engine. On the other hand, the use of a separate lubricant for the moving parts of a rotating closed Rankine cycle engine presents the probelm and difficulty of effectively isolating the power fluid from the lubricant. This could be accomplished to a resonable degree by the use of high speed seals but, apart from the complication and cost of such seals, they are not a satisfactory solution to the problem primarily because they absorb substantial power from the engine and also because they cannot be made completely effective.

With the foregoing in mind, an object of the present invention is to provide a rotating closed Rankine cycle engine having novel means for lubricating and cooling the internal moving parts of the engine. as set Another object of the invention is to provide a rotating closed Rankine cycle engine having novel lubricating means as set forth that does not require the use of high speed seals to effectively isolate the engine power fluid from the lubricant.

A further object of the invention is to provide a rotating closed closed Rankine engine having novel lubricating means that may be effectively employed for lubricating the internal parts of the engine when the latter is rotationally driven internally directly from the primary power output of the engine or indirectly from an independent external source of rotary motion.

These and other objects of the invention and the various features and details of the construction and operation thereof are hereinafter set forth and described with reference to the accompanying drawings, in which.

Figure 1:
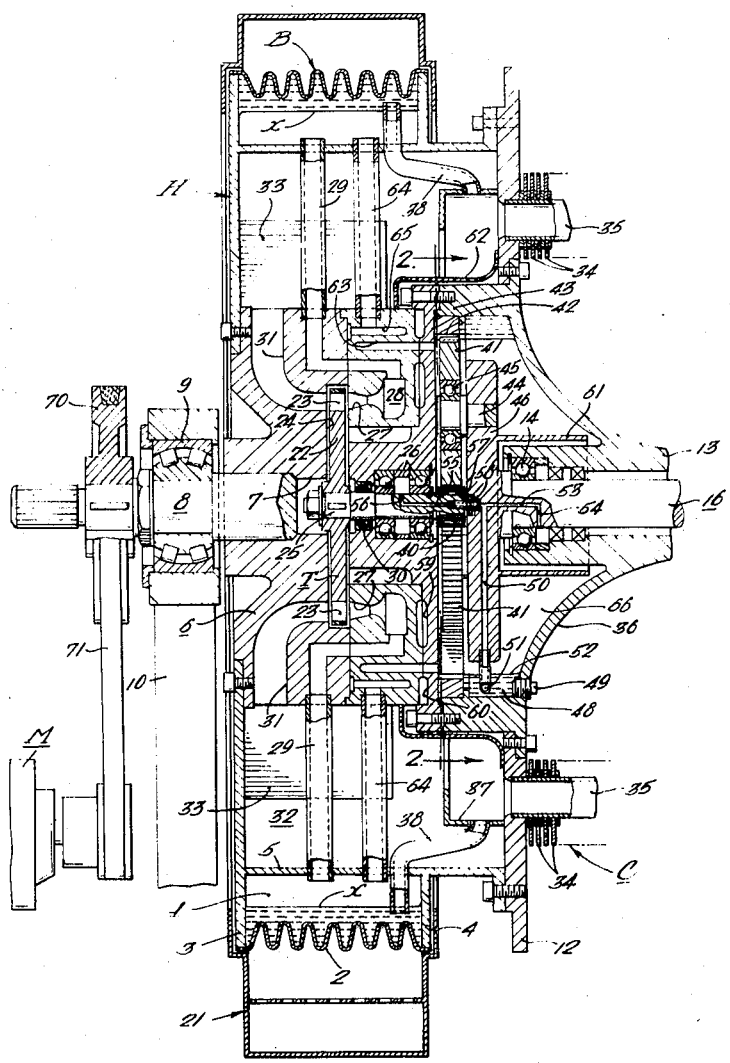
FIG. 1 is a typical fragmentary sectional view diametrically through a rotary closed Rankine cycle engine embodying the present invention.

Referring now to the drawings, and more particularly to FIG. 1 thereof, there is disclosed a rotary closed Rankine cycle engine embodying the present invention that comprises a housing H including a boiler B, a suitable expander such as, for example, a turbine T, a rotary condenser C coupled to the boiler for rotation therewith as a unit, and means driven by the expander and connected to the boiler-condenser unit to rotationally drive the latter at a predetermined speed, as hereinafter set forth and described.

In the embodiment of the invention shown in FIG. 1 of the drawings, the rotary housing H and boiler B is constructed and operable, for example, substantially as shown and described in my U. S. Pat. No. 3,613,368 issued Oct, 19, 1971. Such a housing and boiler comprises a cylindrical chamber 1 defined by an outer continuous circumferentially extending wall 2, side walls 3 and 4, and an inner cylindrical wall 5. The boiler chamber wall 3 extends radially inward and is and is at its inner end to an annular hub structure 6 disposed coaxially with respect to and internally of the boiler B. The hub 6 has a central bore 7 extending axially therethrough and mounted coaxially in the outer end thereof is a shaft 8 that is securedin the hub 6 for rotation therewith. The shaft 8 is rotatably journalled in a bearin 9 that is mounted in a fixed standard or support 10.

The inner cylindrical wall 5 of the boiler is fixedly secured to the peripheral portion of the adjacent surface of a radially extending coaxially circular plate or disk 12 that projects outwardly from the inner end of a coaxially extending tubular shaft 13. The tubular shaft 13 and plate 12 are rotatably mounted by means of a bearing 14 upon a coaxially extending stationary shaft 16 that has its outer end suitably supported coaxially of the engine.

The rotary boiler is adapted to be driven about its axis at a predetermined speed of rotation calculated to create the centrifugal force necessary to dispose and maintain the selected boiler liquid therein uniformly distributed circumferentially about and in contact with the inner surface of the outer peripheral wall 2 of the boiler with a liquid/vapor interface, designated $x$ in FIG. 1, that is highly stable and essentially cylindrical and concentric with the axis of rotation with the boiler. Essentially the liquid/vapor interface $x$ is disposed at a predetermined radius from the rotation axis of the boiler to provide high boiling heat fluxes in excess of those obtainable at ambient gravity. The annular body of liquid in the boiler may be heated to the required boiling temperature to vaporize the same, for example, by the combustion of a suitable fuel-air mixture in a stationary combustion box 21 that may be constructed and arranged about the boiler as shown and described in my aforesaid patent.

The expander, in the form of a turbine T, constructed and operable, for example, generally as shown and described in my aforesaid U. S. Pat. No. 3,613,368, comprises a rotor 22 having a series of turbine blades 23 arranged peripherally thereabout. The turbine rotor 22 is received within an annular recess 24 provided in the hub structure 6 and is mounted for coaxial rotation independently of the boiler B on a shaft 25 that is rotationally supported within bore 7 of the hub 6 by means of bearings 26. An annular series of nozzles 27 is provided in the hub 6 coaxially adjacent the turbine rotor 22 in confronting relation to the blades 23 thereof and high pressure vapor is supplied to the nozzles 27 from an annular manifold 28.

High pressure vapor is supplied from the boiler chamber 1 to the manifold 28 by a plurality of vapor tubes 29 arranged in equally spaced relation circumferentially of the axis to insure rotational balance in the boiler. The high pressure vapor discharged from the manifold 28 through the nozzles 27 impinges upon the blades 23 to drive the turbine rotor 22 and its shaft 25 at the desired speed of rotation. A no-contact labyrinth seal 30 is provided about the shaft 25 inwardly adjacent the turbine rotor 22 to reduce migration of the pressure vapor from the turbine along shaft 25.

An annular diffuser 31 is provided in the hub 6 to receive the exhaust vapor from the expander, such as turbine T, and discharge it into an annular exhaust chamber 32 from which it passes into the condenser C. A plurality of axially extending radial partitions or baffles 33 is provided in the exhaust chamber 32 and arranged in equally spaced relation circumferentially about the engine axis to maintain the angular velocity of the exhaust vapor at that of the rotating boiler-condenser unit and to direct the vapor toward and into the condenser C.

In the illustrated embodiment of the invention the condenser C is constructed and operable as shown and described in my aforesaid U. S. Pat. and in my copending U.S. Pat. application Ser. No. 110,478, filed Jan. 28, 1971. Thus, the condenser C comprises a coaxial array of annular radial fins 34 and axial heat exchange tubes 35 mounted for rotation with the boiler B, plate 12 and shaft 13 as a unit. The central portion of the plate 12 curves inwardly and endwise to the shaft 13, as indicated at 36, to provide a smooth curvilinear surface for directing a cooling fluid, such as air, outwardly through the condenser fins 34. The turbine exhaust vapor discharged to the chamber 32 passes into the heat exchange tubes 35 where it is condensed by heat exchange with a cooling fluid, and then flows into an annular collector 37 from which it is discharged radially by centrifugal force generated by rotation of the condenser C, through a plurality of conduits 38 and returned to the boiler chamber 1.

Figure 2:
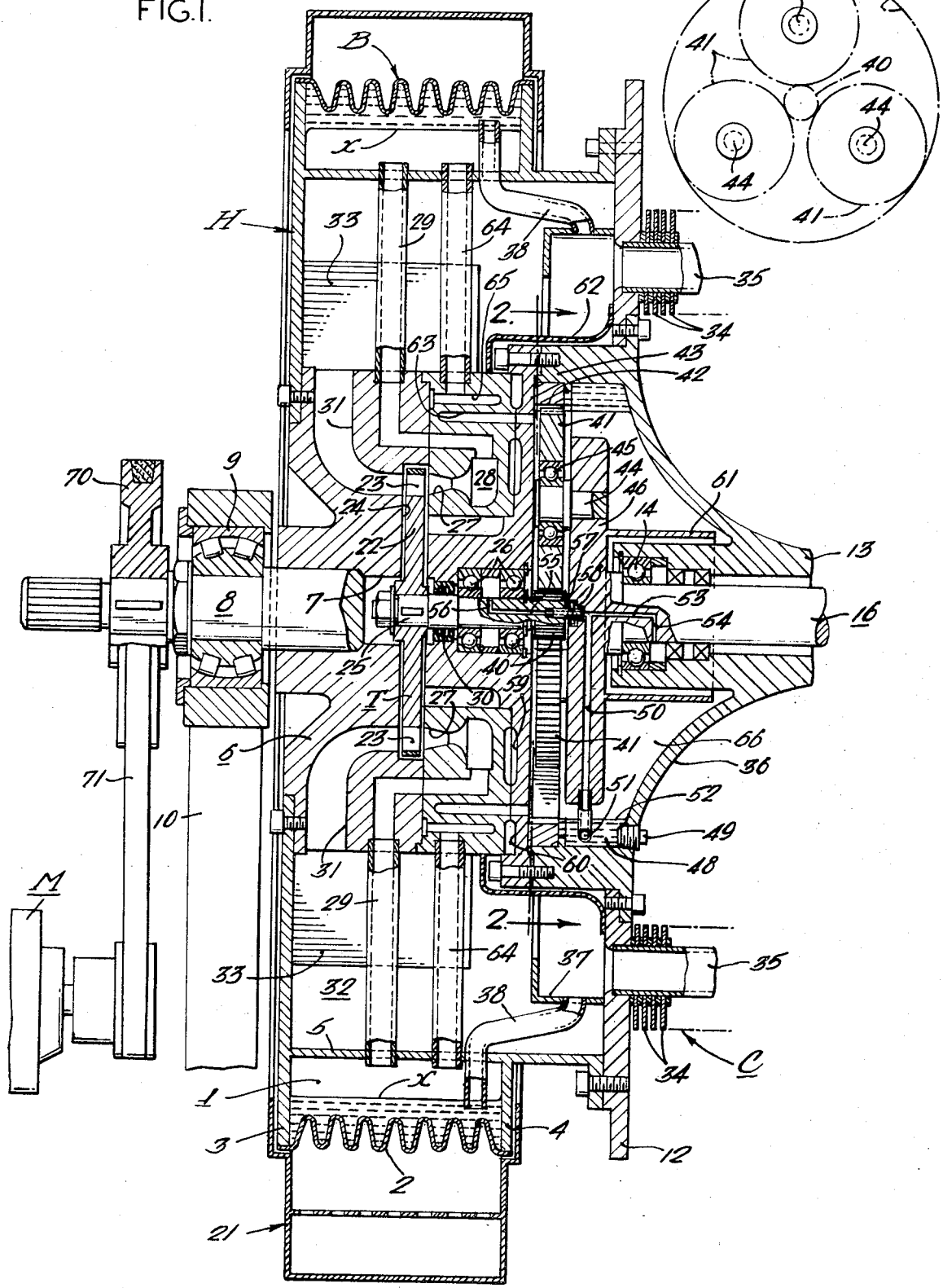
FIG. 2 is a schematic view on line 2—2, FIG. 1.

The boiler-condenser unit is rotationally driven continuously by the primary power output generated by the engine by means of an internal occluded fixed-ratio gear train arranged coaxially of the engine axis and interiorly of the rotary boiler-condenser unit. In the embodiment of the invention shown in FIGS. 1 and 2, the gear train comprises a sun gear 40 fixedly mounted on and driven by the turbine shaft 25. Meshed with the sun gear 40 is a plurality of planetary gears 41 that are also meshed with a circumscribing annular ring gear 42 fixedly mounted on and carried by an annular flange 43 that is formed integral with and projects axially inward from the adjacent face of the palte 12. In the present embodiment, three planetary gears 41 are provided and arranged in equally spaced relation circumferentially about the engine axis. Each of the planetary gears 41 is rotatably mounted on a stub shaft 44 by means of a bearing 45 and each stub shaft 44 is fixedly mounted in a stationary spider portion 46 provided at the the stationary end of the stationary shaft 16. The stationary spider 46 functions as a torque anchor and opposes the reaction torque generated by the engine. By this construction the axes of the planetary gears 41 are fixedly positioned so that they do not rotate or move circumferentially relative to or about the engine axis. Thus, the full power output of the engine expander is transmitted from the driving sun gear 40 through the planetary gears 41 directly to the driven ring gear 42 on the boiler-condenser unit at the fixed-speed ratio of the particular gear train.

However, it will be apparent that at start-up there will be no pressure vapor generated by the boiler B to drive the turbine and in turn the boiler-condenser unit. Consequently, at start-up it is necessary to independently drive the boiler-condenser unit at the designed predetermined speed of rotation to establish and maintain the liquid/vapor interface $x$ in the boiler chamber 1 until the annular body of liquid in the boiler is heated to the temperature to produce the desired pressure vapor to drive the turbine rotor 22. This may be accomplished, for example, by means of a starter motor M driving a pulley 70 fixed on the engine shaft 8 through a belt or chain 71. Means such as a clutch (not shown), can be provided for breaking the drive between motor M and pulley 70 when the engine attains normal operation, or the motor can continue to be driven by the shaft 8 to function as a generator operable, for example, for charging a battery that powers accessories such as the starter motor, lights and the like.

In accordance with the present invention, the various moving parts of the engine are lubricated by a force feed system utilizing a Pitot type pump. As shown in FIG. 1 of the drawings, the plate 12 and flange 43 cooperate with the adjacent portion of the engine hub 6 to provide an annular lubricant sump 48 having a fill and drain plug 49. In the embodiment shown, the ring gear 42 of the fixed-ratio gear train, being mounted on the flange 43 as previously described, is disposed in the sump 48. The Pitot pump comprises a radial passage 50 formed in the stationary spider 46 and having at its outer end an L-shaped tip 51, the inlet end of which is immersed in an annular bath of lubricant 52 in the sump 48, with the inlet thereto facing opposite the direction of rotation of the engine. The predetermined speed at which the boiler is rotationally driven to maintain the annular liquid body of power fluid in the boiler also maintains the annular lubricant path 52 in the sump 48.

The inner end of the passage 50 is connected to a coaxial passage 53 formed in the spider portion 46 and extending a short distance into the adjacent end portion of the shaft 16 where it connects with a radial passage 54 that opens adjacent the bearing 14. A coaxial passage 55 extends through the sun gear 40 and adjacent portion of the turbine shaft 25 where it connects with a radial passage 56 that opens between the axially spaced bearings 26. Connection between the nonrotating passage 53 and the passage 55 in the rotating sun gear 40 is made by means of a connector tube 57 that has one end fixed in the passage 55 for rotation with the sun gear 40 and the other end mounted coaxially within the stationary passage 53 by means of a screw seal 58, for example, as shown in FIG. 1.

Rotation of the engine relative to the non-rotating spider 46 operates to pump lubricant from the bath 52 inwardly of the tip 51 and through the passage 50 and the connecting passages to the bearings 14 and 26. Since the ring gear 42 is immersed in the annular bath of lubricant as shown in the drawings, the gears 40 and 41 will be lubricated by contact with the ring gear and the lubricant picked up by gears 40 and 41 will flow radially over the said gears and return to the sump. In the case where the ring gear 42 is not in the lubricant bath 52, the gears may be effectively lubricated by providing a radial passage (not shown) in the sun gear 40 leading from the axial passage 55 and opening to the teeth of the sun gear that is meshed with the planetary gears 41. Lubricant supplied to the gears and bearings drains back to the bath 52 in the sump 48 under the influence of centrifugal force.

The lubricant sump 48 is ideally located close to the condenser C so that it will be as cool as possible. To this end the sump 48 is thermally isolated from the hot turbine parts of the engine by annular voids or spaces 59 and 60 provided therebetween and the lubricant bath 52 in the sump is also cooled by contact with the curved portion 36 of the housing plate 12 that in turn is cooled by contact with the heat exchange fluid (air) flowing through the condenser C. A sleeve or collar 61 on the stationary spider 46 extends axially therefrom in circumscribing relation about the inner end of the rotatable tubular shaft 13 to collect lubricant that drains from the bearing 14 and direct it over the inner surface of the air-cooled portion 36 of plate 12 so that it is further cooled en route back to the sump 48. In addition, the sump 48 and bath of lubricant are further thermally isolated from the high temperature in the turbine exhaust chamber 32 by means of an annular barrier 62 of suitable insulating material such as, for example, molded fiberglass that functions also to subdivide the interior of the engine housing into an expander compartment and a lubricant sump compartment.

A unique feature of the present invention is the construction and arrangement thereof that enables the use of separate power fluid and lubricant without the necessity of providing a positive high speed seal on the shaft 25 to prevent the migration of power fluid along the shaft 25 from the turbine T to the lubricant sump 48. A typical example of a suitable power fluid that may be employed efficiently in the present invention is a mixture of the isomers of trichlorotrifluorobenzene and the lubricant bath 52 in the sump 48 may comprise, for example, a mixture of about equal parts by weight of the aforesaid power fluid and a lubricant material such as Krytox 143 fluorinated oil. Other lubricants such as, for example, poly(phenyl ether) and Zonyl E-7 and E-91 fluoroalkyl esters may also be employed. Alternatively, suitable amounts of finely divided graphite or finely divided molybdenum disulfide might also be employed as the lubricant material in the bath 52. In any event, it is necessary that the lubricant be stable at high temperatures and have a very low volatility so as to minimize loss thereof from the lubricant bath 52 in the sump.

The fill and drain plug 49 may be used to supply the sump 48 with the required amount of working fluid and lubricant mixture. Solubility of the lubricant in the working fluid of the bath 52 is not necessary since the stirring action caused by the rotational movement of the sump relative to the pump tip 51 forms an emulsion or temporary suspension of the lubricant in the working fluid of the bath 52.

During operation of the engine, at least initially some of the power fluid from the turbine T will migrate along the shaft 25 through the no-contact labyrinth seal 30 and find its way into the lubricant bath 52 in the sump 48. This additional power fluid condensing in the lubricant in the sump 48 will increase the radial depth of the bath 52 and, in accordance with the present invention, means is provided for distilling or vaporizing off the excess power fluid from the lubricant bath 52 when the latter attains a predetermined maximum radial depth.

In the illustrated embodiment of the invention, thisis accomplished by providing in the hub structure 6 an annular chamber 63 of small radial dimension that extends axially laterally from the sump 48 and is disposed radially from the engine axis a distance corresponding to the surface level of the lubricant bath at the predetermined maximum radial depth thereof. Thus, when migration of power fluid from the turbine along shaft 25 to the sump 48 has increased the radial depth of the bath 52 above the predetermined maximum depth, the mixture of lubricant and excess power fluid will overflow from the sump into the chamber 63 where it is heated to a temperature sufficiently high to distill and vaporize off the excess power fluid from the lubricant. The chamber 63 is heated to the required temperature by hot pressure vapor from the boiler B supplied by tubes 64 to an adjacent circumscribing annular heating chamber 65.

Heating the overflow from the sump 48 in the chamber 63 to distill or vaporize off the excess power fluid therein raises the vapor pressure in the engine chamber 66 containing the sump and gear train to the vapor pressure at the turbine T thereby balancing the pressure across the labyrinth seal 30 and precluding further migration of power fluid along shaft 25 from the turbine T to the sump 48. This arrangement entirely eliminates the need for a high speed seal on the shaft 25 which would be not only expensive but also consume substantial power and be difficult to make completely effective in preventing fluid flow.

The present invention is not limited in its use to rotary engines of the construction previously described in which the boiler-condenser unit is rotationally driven through an internal gear train directly from the primary power output of the engine, and the invention may be employed effectively for lubricating the internal moving parts of a rotary engine in which the boiler-condenser unit is rotationally driven independently of the Rankine engine by a source of rotary power located externally of the engine.

Figure 3:
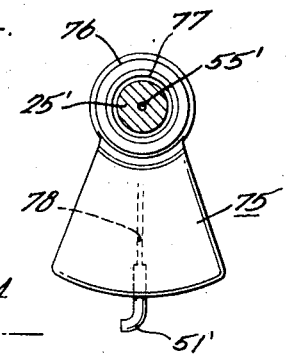
FIG. 3 is a fragmentary sectional view similar to FIG. 1 showing another engine embodiment of the present invention.
Figure 4:
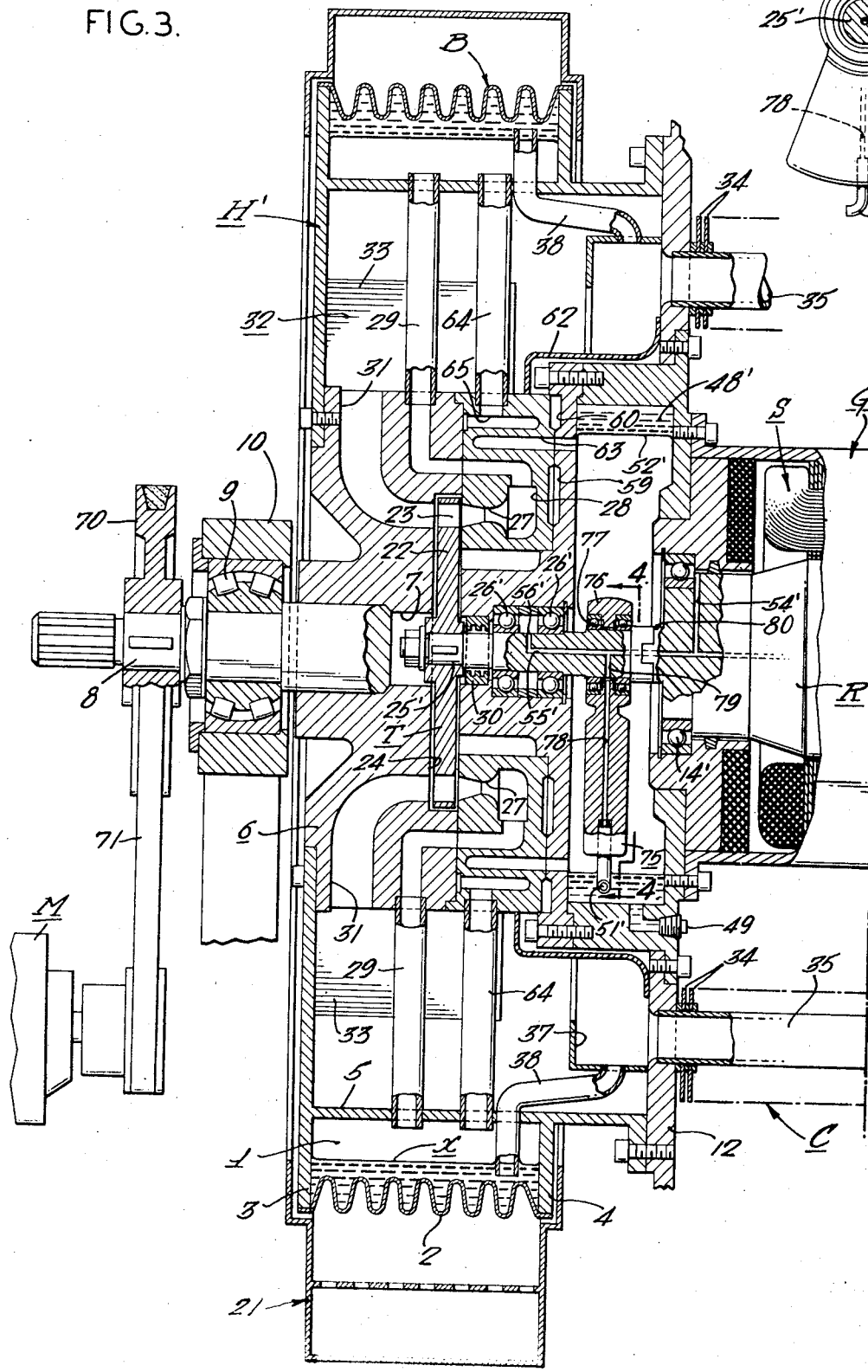
FIG. 4 is a fragmentary transverse sectional view on line 4—4, FIG. 3.

An embodiment of an externally driven rotary engine employing the present invention is shown in FIGS. 3 and 4 of the drawings. Except for structural differences hereinafter described, the apparatus seown in FIG. 3 is otherwise identical to the embodiment shown in FIG. 1 and, accordingly, elements and parts in FIG. 3 that are identical to elements and parts in FIG. 1 are identified by the same reference numbers and letters to avoid unnecessary repetition of description thereof.

Referring to FIG. 3, the engine housing, boiler, expander and condenser are constructed and arranged as previously described except that the internal fixed-ratio gear train for driving the boiler-condenser unit has been eliminated and the boiler-condenser unit is continuously driven at the desired predetermined speed of rotation by means of the motor M driving pulley 70 fixed on the engine shaft 8 through the belt or chain 71. Also, the turbine shaft 25' is directly coupled to and rotationally drives the coaxial shaft 80 of the rotor R of a generator G mounted coaxially within the condenser C and having its stator and windings S fixedly secured to the engine housing H for rotation with the boiler-condenser as a unit relative to the rotor R. Of course, other machinery and equipment can be coupled to and driven by the turbine shaft 25' as desired.

In the embodiment of the invention shown in FIG. 3 the internal moving engine parts are lubricated by a force feed system of the type previously described utilizing a Pitot pump incorporated in a pendulum member 75 having a hub portion 76 journalled on the turbine shaft 25' by means of bearings 77. The pendulum is of predetermined density and dimensions operable to hold the pendulum in the position shown and prevent rotation thereof about the engine axis during operation of the engine. As shown, the pendulum 75 depends radially and terminates adjacent the operating surface level of the lubricant path 52' in the sump 48'. In the present embodiment, the Pitot pump comprises a radial passage 78 formed in the pendulum 75 and having at its outer end an L-shaped tip 51'. The end of the tip 51' is immersed in the lubricant bath 52' and the inlet to the tip is disposed facing in the direction opposite the direction of rotation of the boiler-condenser unit as previously described.

The inner end of the radial passage 78 in the pendulum is in communication with a radial passage 79 in the turbine shaft 25' that in turn communicates with a coaxial passage 55' therein. The coaxial passage 55' connects with a radial passage 56' that opens outwardly intermediate the shaft bearings 26' and also connects with a radial passage 54' that opens adjacent the bearing 14' in which is journalled the shaft of rotor R of the generator G. As indicated, but not fully shown, the passage 55' extends axially beyond the passage 54' to the other end of the shaft of rotor R to lubricate a bearing similar to bearing 14' that rotationally supports the outer end of the rotor shaft. During operation of the engine, rotation of the boiler-condenser unit and sump 48' relative to the stationary or non-rotating pendulum 75 operates to pump lubricant from the bath 52' inwardly of the tip 51' and through the passages 78, 79, 55', 56' and 54' to the bearings described. Lubricant thus supplied to the bearings drains back to the bath 52' in sump 48' under the influence of centrifugal force.

Apart from the differences described, operation of the engine embodiment shown in FIG. 3 is essentially the same as previously described and need not be repeated.

From the foregoing, it will be observed that the present invention provides a novel lubrication system for closed Rankine cycle engines of the rotating type that enables the use of separate power fluid and lubricant and also eliminates the need for high speed seals to isolate the power fluid from the lubricant.

While certain embodiments of the invention have been illustrated and described, it is not intended to limit the invention to such disclosures, and it is contemplated that changes and modifications may be made and incorporated as desired or required, within the scope of the following claims.

I claim:
1. A rotary closed Rankine cycle engine comprising:
a cylindrical housing rotatable about its axis and including an annular boiler adapted to contain an annular body of liquid power fluid,
means to heat the liquid in the boiler to generate power fluid pressure vapor therein,
means subdividing the housing into an expander compartment and lubricant compartment,
an expander in said expander compartment for extracting work from said pressure vapor including a coaxially rotatable shaft driven thereby and extending into the lubricant compartment of the housing,
an annular sump in said lubricant compartment adapted to contain an annular lubricant bath of predetermined radial depth,
means operable to rotationally drive the housing and boiler about said axis at a predetermined speed to maintain the annular liquid bodies of power fluid and lubricant in the boiler and sump respectively,
pump means in the lubricant compartment non-rotatable with the housing having a lubricant passage extending inwardly from the lubricant bath to said shaft with the inlet to said passage immersed in the lubricant bath and facing opposite the direction of rotation of the housing whereby rotation of said housing relative to said pump means operates to pump lubricant inwardly from the bath through the passage to lubricate said shaft,
and means for heating and vaporizing excess power fluid that migrates along the shaft from the expander compartment to the sump thereby raising the vapor pressure in the lubricant compartment substantially to the vapor pressure in the expander compartment and balancing the pressure axially along the shaft to prevent further migration of power fluid from the expander compartment to the lubricant compartment of the housing.

2. A rotary engine as claimed in claim 1 wherein the means to rotationally drive the housing and boiler comprises a fixed-ratio gear train interconnected between the shaft and housing and lubricated by lubricant from the bath.

3. A rotary engine as claimed in claim 1 wherein bearings are provided for rotationally supporting the shaft, and passages are provided in said shaft for conducting lubricant from the pump means to said bearings for lubricating the bearings.

4. A rotary engine as claimed in claim 1 wherein the means for heating and vaporizing the excess power fluid migrating to the sump comprises an annular overflow chamber disposed laterally adjacent the lubricant sump substantially at the surface level of the predetermined radial depth of the lubricant bath therein for receiving overflow of said lubricant bath caused by said migration of power fluid to the sump, and means for heating the annular chamber to vaporize power fluid from the overflow lubricant bath therein.

5. A rotary engine as claimed in claim 4 wherein the means for heating the annular overflow chamber comprises a second annular chamber concentrically circumscribing the overflow chamber, and means for supplying hot pressure vapor power fluid from the boiler to said second chamber.

6. A rotary engine as claimed in claim 2 wherein the fixed-ratio gear train includes a plurality of planetary gears, and the non-rotatable pump means is a stationary member on which said planetary gears are rotatably mounted so that the axes of the planetary gears are fixedly positioned circumferentially with respect to the rotational axis of the engine.

7. A rotary engine as claimed in claim 1 wherein the non-rotatable pump means comprises a pendulum member journalled on the expander shaft and having a density and dimensions operable to hold said pendulum member in dependent position and prevent rotation thereof about the rotational axis of the engine.

* * * * *

UNITED STATES PATENT OFFICE
CERTIFICATE OF CORRECTION

Patent No. 3,744,246              Dated  July 10, 1973

Inventor(s)  William A. Doerner

It is certified that error appears in the above-identified patent and that said Letters Patent are hereby corrected as shown below:

Col. 1, line 31; "probelm" should read --problem--.

line 41; delete "as set".

line 48; delete "closed" (second occurrence)

line 48; after "Rankine" insert --cycle--.

Col. 2, line 19; delete "and is" (second occurrence) and substitute --connected--.

line 24; "securedin" should be --secured in--.

line 25; "bearin" should read --bearing--.

line 44; "with" should be --of--. (second occurrence)

Col. 3, line 56; "palte" should be --plate--.

lines 62 and 63; delete "the stationary" and insert --inner--.

line 63; "thestationary" should read --the stationary--.

UNITED STATES PATENT OFFICE
CERTIFICATE OF CORRECTION

Patent No. 3,744,246　　　　　　　　Dated July 10, 1973

Inventor(x) William A. Doerner　　　　　　Page -2-

It is certified that error appears in the above-identified patent and that said Letters Patent are hereby corrected as shown below:

Col. 4, line 19; "abelt" should read -- a belt--.

line 43; "path" should read --bath--.

line 61, "tothe" should read -- to the--.

Col. 5, line 40; after "trichlorotrifluorobenzene"

insert --described in U. S. Patent 3,702,534 issued November 14, 1972--.

line 44; after "Krytox" insert "R" in a circle.

line 45; after "Zonyl" insert "R" in a circle.

Col. 6, line 6; "thisis" should read --this is--.

line 49; "seown" should read --shown--.

Col. 7, line 15; "path" should read --bath--.

-2-

Signed and sealed this 17th day of September 1974.

(SEAL)
Attest:

McCOY M. GIBSON JR.
Attesting Officer

C. MARSHALL DANN
Commissioner of Patents